(12) United States Patent
Solf

(10) Patent No.: US 9,733,471 B2
(45) Date of Patent: Aug. 15, 2017

(54) MICROMECHANICAL DEVICE FOR PROJECTING AN IMAGE AND FOR ANALYZING AN OPTICAL SPECTRUM AND CORRESPONDING MANUFACTURING METHOD

(71) Applicant: Robert Bosch GmbH, Stuttgart (DE)

(72) Inventor: Christian Solf, Rheinstetten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/136,730

(22) Filed: Apr. 22, 2016

(65) Prior Publication Data

US 2016/0320611 A1  Nov. 3, 2016

(30) Foreign Application Priority Data

Apr. 29, 2015 (DE) .................. 10 2015 207 916

(51) Int. Cl.
| | |
|---|---|
| *G02B 26/08* | (2006.01) |
| *G02B 26/10* | (2006.01) |
| *H04N 9/31* | (2006.01) |
| *G01J 3/18* | (2006.01) |
| *G01J 3/457* | (2006.01) |

(52) U.S. Cl.
CPC .............. *G02B 26/101* (2013.01); *G01J 3/18* (2013.01); *G01J 3/457* (2013.01); *G02B 26/0808* (2013.01); *G02B 26/0841* (2013.01); *H04N 9/3129* (2013.01); *H04N 9/3173* (2013.01); *H04N 9/3194* (2013.01)

(58) Field of Classification Search
CPC .............. G02B 26/101; G02B 26/0808; G02B 26/0841; G02B 5/1828; G02B 6/29311; G02B 6/29382; G01J 3/18; G01J 3/457; G01J 3/24; G01J 3/021; G01J 3/0208; H04N 9/3129; H04N 9/3173; H04N 9/3194
USPC ....................................... 359/202.1
See application file for complete search history.

(56) References Cited

U.S. PATENT DOCUMENTS

| | | |
|---|---|---|
| 8,279,509 B2 | 10/2012 | Maruyama et al. |
| 8,390,806 B1 | 3/2013 | Subramanian |
| 2002/0079432 A1* | 6/2002 | Lee .................... G02B 26/0841 250/216 |

* cited by examiner

*Primary Examiner* — Euncha Cherry
(74) *Attorney, Agent, or Firm* — Norton Rose Fulbright US LLP; Gerard Messina

(57) ABSTRACT

A micromechanical device for projecting an image and for analyzing an optical spectrum and a corresponding manufacturing method. The device includes: a first light providing unit by which a first light beam is providable to the device; a diffraction unit for diffract the first light beam provided to the device as a function of a diffraction property of the diffraction unit; a second light providing unit by which a second light beam is providable to the device; a micromirror by which the second light beam provided to the device is variably deflectable as a function of a position and/or an orientation of the first micromirror; and a first actuator by which the adjustable diffraction property of the optical diffraction unit and also the position and/or the orientation of the micromirror are adjustable.

10 Claims, 4 Drawing Sheets

MICROMECHANICAL DEVICE FOR PROJECTING AN IMAGE AND FOR ANALYZING AN OPTICAL SPECTRUM AND CORRESPONDING MANUFACTURING METHOD

FIELD OF THE INVENTION

The present invention relates to a micromechanical device for projecting an image and for analyzing an optical spectrum and a corresponding manufacturing method.

BACKGROUND INFORMATION

Micromechanical devices for projecting an image, which are also called micro beamers, pico projectors, etc., are enjoying increasing popularity, in particular for use in mobile terminal devices like smartphones or laptops. Light scanners are generally used here, i.e., devices in which at least one light beam, in particular a laser beam, is deflectable into two directions perpendicular to one another, in order to generate the image to be projected through serial scanning of points on a projection surface and switching the light beam on and off. The deflection of the light beam is often effectuated by at least two adjustably moveable micromechanical mirrors, so-called micromirrors or MEMS mirrors.

A micromirror and a method for manufacturing the same are discussed in U.S. Pat. No. 8,279,509 B2.

Furthermore, there is a need for easy-to-handle spectrometers, in particular for micromechanical spectrometers, which are also called MEMS spectrometers. In spectrometers of this type, a light beam to be analyzed is often diffracted in an adjustable way, for example, at a fixed point, and a light intensity is measured. The spectrum of the light beam may be ascertained from the light intensity measurement, together with the associated adjustments for the diffraction.

A MEMS spectrometer is discussed in U.S. Pat. No. 8,390,806 B1 in which a light beam to be analyzed is diffracted with the aid of an integrated reflecting grating.

SUMMARY OF THE INVENTION

The present invention provides a micromechanical device for projecting an image and for analyzing an optical spectrum including the features described herein and a manufacturing method including the features described herein.

Accordingly, a micromechanical device is provided for projecting an image and for analyzing an optical spectrum, including: a first light providing unit with the aid of which a first light beam is providable to the device; an optical diffraction unit which is configured for the purpose of diffracting the first light beam provided to the device, in particular, for analyzing an optical spectrum of the first light beam, as a function of an adjustable diffraction property of the optical diffraction unit; a second light providing unit with the aid of which a second light beam is providable to the device; a first micromirror with the aid of which the second light beam provided to the device is variably deflectable, in particular, for projecting an image, as a function of a position and/or an orientation of the first micromirror; and a first actuator with the aid of which the adjustable diffraction property of the optical diffraction unit and also the position and/or the orientation of the first micromirror are adjustable.

A light beam is also to be understood as a laser beam. In particular, all described light beams may be laser beams.

Furthermore, a method is provided for manufacturing a micromechanical device for projecting an image and for analyzing an optical spectrum, including the steps: forming a first light providing unit with the aid of which a first light beam may be provided to the device; forming an optical diffraction unit in such a way that the first light beam provided to the device is diffractable, in particular, for analyzing an optical spectrum of the first light beam, as a function of an adjustable diffraction property of the optical diffraction unit; forming a second light providing unit with the aid of which a second light beam is providable to the device, forming a first micromirror with the aid or which the second light beam provided to the device, in particular, for projecting an image, is variably deflectable as a function of a position and/or an orientation of the first micromirror; and forming a first actuator with the aid of which the adjustable diffraction property of the optical diffraction unit and also the position and/or orientation of the first micromirror are adjustable.

The finding underlying the present invention is the fact that a device for analyzing an optical spectrum of a first light beam may be advantageously combined with a device for projecting an image with the aid of a second light beam. Thus, space may be saved, which is particularly advantageous for mobile applications, i.e., for a use of the device according to the present invention in smartphones, laptops, etc. Furthermore, components to be manufactured, which are precisely manufacturable with high technical complexity, may thus meet multiple functions so that as a whole, less technical complexity has to be employed.

The underlying idea of the present invention now lies in taking this finding into account and providing a device, in which one and the same actuator manages the influencing of the diffraction properties of the optical diffraction unit as well as an adjustable, i.e., controllable deflection of the projecting second light beam in at least one dimension.

One and the same optical bench may thus be used at least twice. An assembly of the deflecting micromirror in the generally highly-precisely manufactured optical bench is comparatively less complex in comparison to the often otherwise carried out adjustment of micromirrors.

The control of the actuator(s) of the device for projecting the image is carried out, for example, by a control device, to which the image to be projected is providable or by which the image to be projected is generatable. An evaluation of the diffracted first light beam may be carried out, for example, with the aid of a computing unit which may be identical to the control device. A microprocessor, for example, may be used as a control device and/or computing unit.

Advantageous specific embodiments and refinements arise from the subclaims and from the description with reference to the figures.

According to another advantageous refinement, the first micromirror has a curved surface as the mirror surface. Thus, at a consistent orientation of the incident second light beam on the first micromirror, an angle, at which the second light beam is deflected by the first micromirror, is adjustable by linear displacement of the first micromirror. The first actuator is advantageously configured for linear displacement of the first micromirror. Thus, the first actuator may be manufactured with little technical complexity and a possibility for adjustable deflection of the second light beam is implementable with little technical complexity. The mirror surface is to be understood as a section on an outer side of the micromirror which is configured for the purpose of reflecting the second light beam.

According to another advantageous refinement, the curved surface of the first micromirror is formed at least as a section of a circular cylinder surface. Thus, the first micromirror is manufacturable with little technical complexity. The curved surface of the first micromirror may, in particular, be formed as a circular cylinder surface. The first micromirror may be configured in the shape of a circular cylinder and thus be easy to manufacture.

According to another advantageous refinement, the first micromirror has a coated section of a glass fiber as a mirror surface. In particular, the first micromirror may be configured as a coated glass fiber section.

According to another advantageous refinement, the second light beam is deflectable onto the first micromirror in such a way that the second light beam strikes the curved surface of the first micromirror at an angle of incidence which is variable with the adjusted position of the first micromirror. For example, a first vector, along which the second light beam strikes the first micromirror, may be non-parallel to a second vector, along which the first micromirror is movable by the first actuator. Thus, an increased maximum deflection angle of the second light beam may arise due to the first micromirror.

According to another advantageous refinement, the optical diffraction unit has a structure with first and second lamellae which engage with one another in a comb-like or finger-like way. The first actuator may be actuatable by applying a first electric potential to the first and/or the second lamellae. Thus, a particularly simple and thus robust and less error-prone adjustability of the actuator is provided. The adjustable diffraction property of the optical diffraction unit may result from a relative positioning of the first and second lamellae to one another, the positioning being based on the electric potential applied to the first and/or second lamellae. In particular, the first and second lamellae may together form an optical grating, for example, a so-called lamellar grating. Due to precise manufacturing of the first and second lamellae, a precisely adjustable diffraction property of the diffraction unit and a precise deflectability of the second light beam by the first micromirror moveable by the first actuator may be simultaneously achieved, whereby the technical complexity is reduced during the manufacture.

According to another advantageous refinement, the device according to the present invention includes a second micromirror and a second actuator, with the aid of which a position and/or an orientation of the second micromirror is adjustable. The first micromirror, the second micromirror, and/or the second light providing unit may be situated in such a way that the second light beam provided to the device with the aid of the second light providing unit is deflectable by the first and also by the second micromirror. The position and/or the orientation of the first micromirror and/or the position and/or the orientation of the second micromirror are adjustable in such a way that the second light beam for projecting the image is deflectable in two directions. For example, the first micromirror may effectuate a deflection in a first direction, for example, in the vertical direction ("out of plane") and the second micromirror may effectuate a deflection in a second direction, which is perpendicular to the first direction, for example, in the horizontal direction ("in plane").

According to another advantageous refinement, the device includes an optical sensor device, to which the first light beam may be guided by the optical diffraction unit, the sensor device being configured to generate an intensity signal on the basis of an intensity of the first light beam guided to the optical sensor device. According to another advantageous refinement, the device includes a computing unit, with the aid of which a property of the optical spectrum of the first light beam is ascertainable on the basis of an instantaneously adjusted diffraction property of the optical diffraction unit and on the basis of the intensity signal generated by the optical sensor device. For example, an intensity of a specific wavelength or in a specific wavelength range of the optical spectrum of the intensity signal is ascertainable.

According to another advantageous embodiment, the computing unit is automatically calibratable using the second light beam as a reference beam.

The present invention will be subsequently described in greater detail by way of the exemplary embodiments represented in the schematic figures of the drawings.

In all figures, identical or functionally identical elements and devices—unless indicated otherwise—are provided with the same reference numerals.

The numbering of the method steps is used for clarity and is not intended to imply a specific chronological sequence in particular, unless indicated otherwise. In particular, multiple method steps may also be carried out simultaneously.

DETAILED DESCRIPTION

Figure 1:
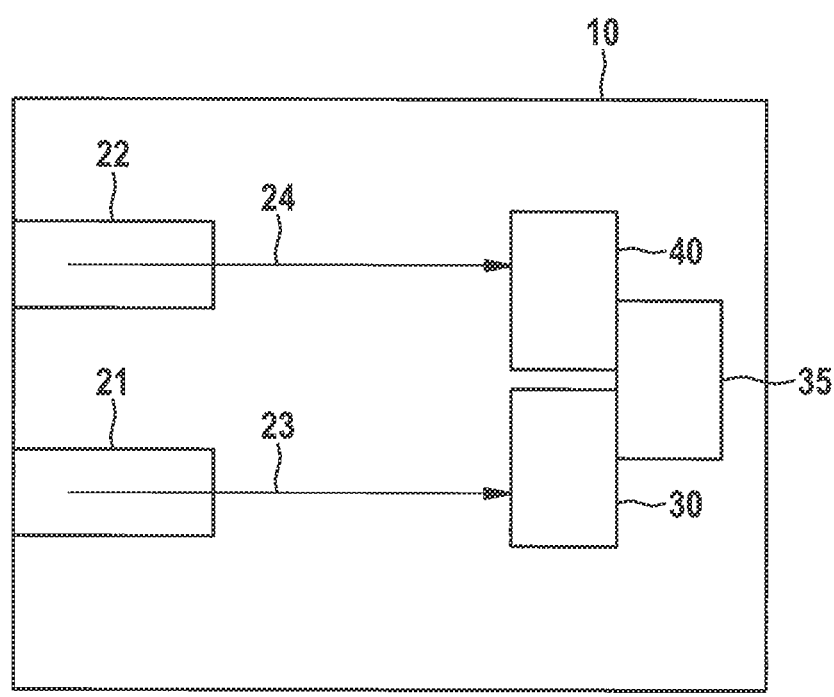
FIG. 1 shows a schematic block diagram of a micromechanical device 10 for projecting an image and for analyzing an optical spectrum according to one specific embodiment of the present invention.

FIG. 1 shows a schematic block diagram of a micromechanical device 10 for projecting an image and for analyzing an optical spectrum according to one specific embodiment of the present invention.

Device 10 includes a first light providing unit 21 with the aid of which a first light beam 23 is providable to device 10. First light providing unit 21 may include a first light source to generate first light beam 23 to be provided to the device. In this case, light providing unit 21 may also be designated as first light generating unit for generating first light beam 21. Alternatively, first light providing unit 21 may also be configured as a first or with a first light input unit with the aid of which a light beam generated outside of device 10 is introducible into device 10.

Device 10 additionally includes an optical diffraction unit 30 which is configured for the purpose of diffracting first light beam 23 provided to device 10 for analyzing an optical spectrum of first light beam 23 as a function of an adjustable diffraction property of optical diffraction unit 30.

Device 10 includes a second light providing unit 22 with the aid of which a second light beam 24 is providable to device 10. Second light providing unit 22 may include a second light source to generate second light beam 24 to be provided to the device. In this case, light providing unit 22 may also be designated as second light generating unit for generating second light beam 24. Alternatively, second light providing unit 22 may also be configured as a second or with a second light input unit, with the aid of which a light beam generated outside of device 10 is introducible into device 10.

Device 10 additionally includes a first micromirror 40, with the aid of which second light beam 24 provided to device 10 is variably deflectable as a function of a position and/or an orientation of first micromirror 40, and a first actuator 35, with the aid of which the adjustable diffraction property of optical diffraction unit 30 and also the position and/or the orientation of first micromirror 40 are adjustable.

Figure 2:
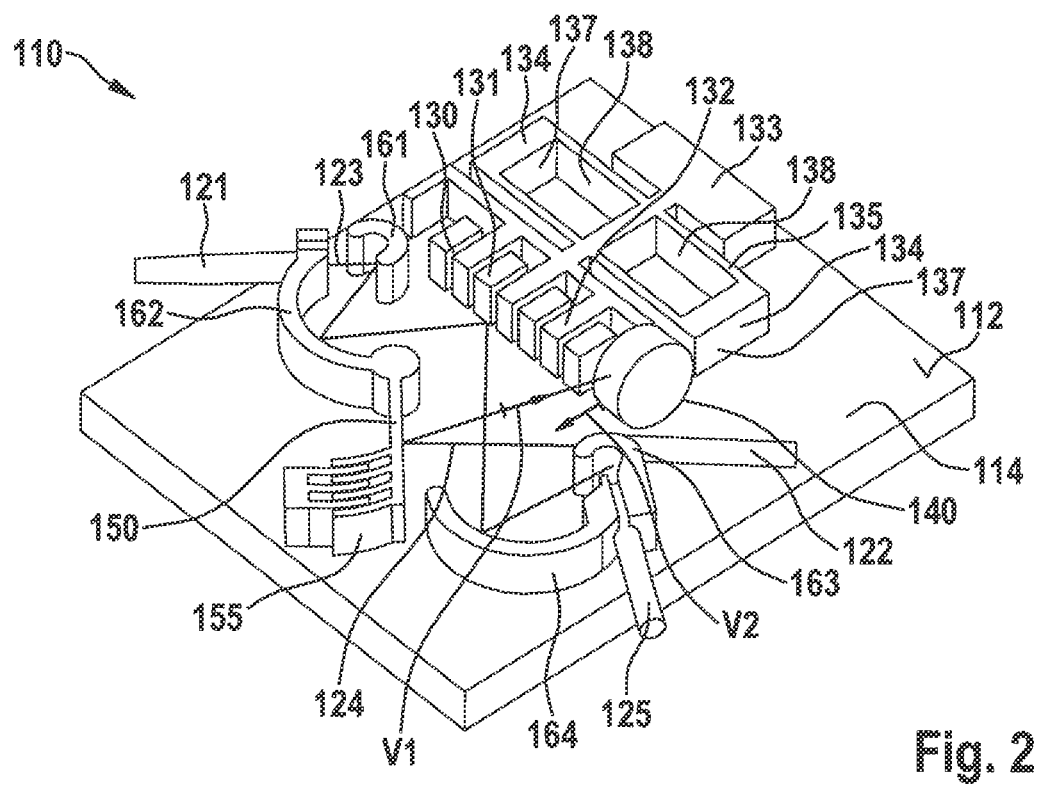
FIG. 2 shows a schematic oblique view of a micromechanical device 110 for projecting an image and for analyzing an optical spectrum according to another specific embodiment of the present invention.
Figure 3:
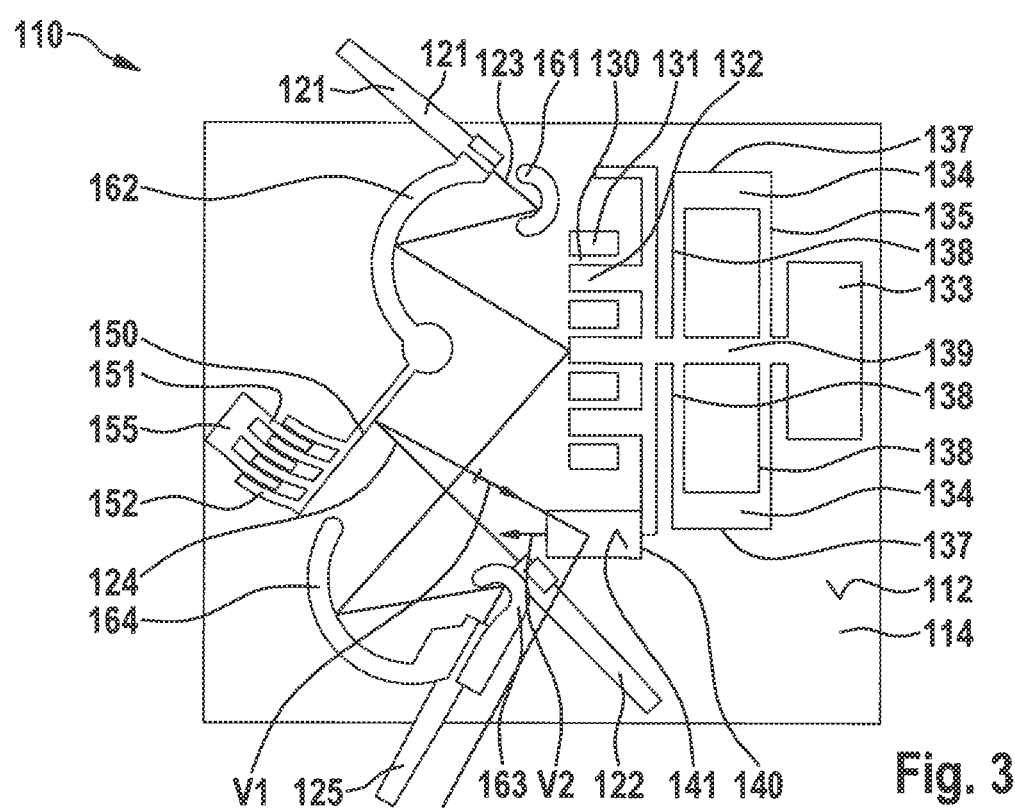
FIG. 3 shows device 110 according to FIG. 2 in a top view.

FIG. 2 shows a schematic oblique view of a micromechanical device 110 for projecting an image and for analyzing an optical spectrum according to another specific embodiment of the present invention. Device 110 is a variant of device 10. FIG. 3 shows device 110 according to FIG. 2 in a top view.

As a first light providing unit, device 110 has a first light input unit 121, with the aid of which an externally generated light beam is introducible into device 110 as first light beam 123. First light input unit 121 is, for example, configured as a glass fiber. First light beam 123 is, in particular, a laser beam. First light input unit 121 is fixed on a surface 112 of a substrate 114 of device 110. Substrate 114 may, for example, be made from silicon or may contain silicon.

Furthermore, a first and a second collimating unit 161, 163 and a first and a second focusing unit 162, 164 are configured on surface 112. First and second collimating units 161, 163 are configured, for example, as concave mirrors with a first curvature radius; first and second focusing units 162, 164 are configured, for example, as concave mirrors with a second curvature radius; the second curvature radius may be, in particular, larger than the first curvature radius. Furthermore, a first light forwarding unit 122 is configured on surface 112 for forwarding within device 110 or for guiding out of device 110, for example, likewise as a glass fiber.

Furthermore, device 110 includes a diffraction unit 130, which is fixed on surface 112 and may also be designated as a lamellar grating. The diffraction unit has first and second lamellae 131, 132 engaging into one another like a comb, first lamellae 131 being fixed on surface 112 and second lamellae 132 being configured to be moveable with respect to the substrate and to first lamellae 131. Second lamellae 132 are preferably configured with a support structure 134 as one piece for this purpose. Support structure 134 has two cuboidal sections 137, which are fixedly connected to surface 112 and are connected to a central beam 139 via four cuboidal sections 138 spaced apart from surface 112; central beam 139 is likewise spaced apart from surface 112.

Second lamellae 132 are provided at a first longitudinal end of central beam 139, a counter weight 133 is provided at a second longitudinal end of central beam 139 so that the second lamellae do not contact, or only contact with little static friction force, on surface 112 of substrate 114. Sections 137 of support structure 134 fixed on surface 112 may thereby function as a fulcrum.

For example, an electric potential difference is generatable between first and second lamellae 131, 132 via correspondingly doped and/or structured areas of substrate 114 or with the aid of vias, possibly by applying a first potential to first lamellae 131 and/or by applying a second potential, which differs from the first potential, to second lamellae 132. By adjusting the potential difference, a relative position of first and second lamellae 131, 132 to one another is adjustable due to electrostatic repulsion, support structure 134, in particular with the aid of sections 138, may exert a restoring spring force. First and second lamellae 131, 132, support structure 134, and counterweight 133 together form the first actuator 135. First and second lamellae 131, 132 engaging into one another form an optical grating as optical diffraction unit 130, whose diffraction properties depend on the relative position of first and second lamellae to one another.

First light input unit 121, first and second collimating unit 161, 163, first and second focusing unit 162, 164, actuator 135, and light forwarding unit 122 are situated relative to one another on surface 112 in such a way that first light beam 123 introduced with the aid of first light input unit 121 initially strikes first collimating unit 161, is reflected from there to first focusing unit 162, from there strikes diffraction unit 130, is diffracted by this—as a function of the instantaneously adjusted diffraction properties—in the direction of second focusing unit 164, is reflected by this onto second collimating unit 163, and is in turn coupled by this into light forwarding unit 122.

A second light input unit 122 is fixed on surface 112 as a second light providing unit of device 110, with the aid of which another externally generated light beam is introducible into device 110 as second light beam 124. Second light input unit 122 is, for example, configured as a glass fiber. Second light beam 124 is, in particular, a laser beam.

At the moveable part of actuator 135, a first micromirror 140 is configured as a cylindrical glass fiber section with a reflecting coating as a mirror surface which is moveable, in particular, linearly along a second vector V2, which is situated parallel to surface 112, by actuating first actuator 135, as described above by generating an electric potential difference between first and second lamellae 131, 132.

Device 110 includes a second micromirror 150 and a second actuator 155, with the aid of which a position and/or an orientation of second micromirror 150 is adjustable. In device 110, the adjustability of a position and/or an orientation of second micromirror 150, in particular, by applying or generating an electric potential difference between third and fourth lamellae 151, 152 of second actuator 155 is achieved for actuating second actuator 155.

First micromirror 140, second micromirror 150, and second light input unit 122 are situated in such a way that second light beam 124, introduced with the aid of second light input unit 122, is deflectable by first and also by second micromirror 140, 150 in combination in such a way, so that the position and/or the orientation of first micromirror 140 and/or the position and/or the orientation of second micromirror 150 is adjustable in such a way that second light beam 124 is deflectable for projecting the image in two directions.

For example, second light beam 124 is deflected along a first vector V1 onto first micromirror 140 in such a way that neither a first projection of first vector V1 onto a first virtual plane, which is situated in parallel to surface 112 and includes second vector V2, nor a second projection of first vector V1 onto a second virtual plane, which is situated perpendicular to surface 112 and includes second vector V2, is situated in parallel to second vector V2.

Figure 4:
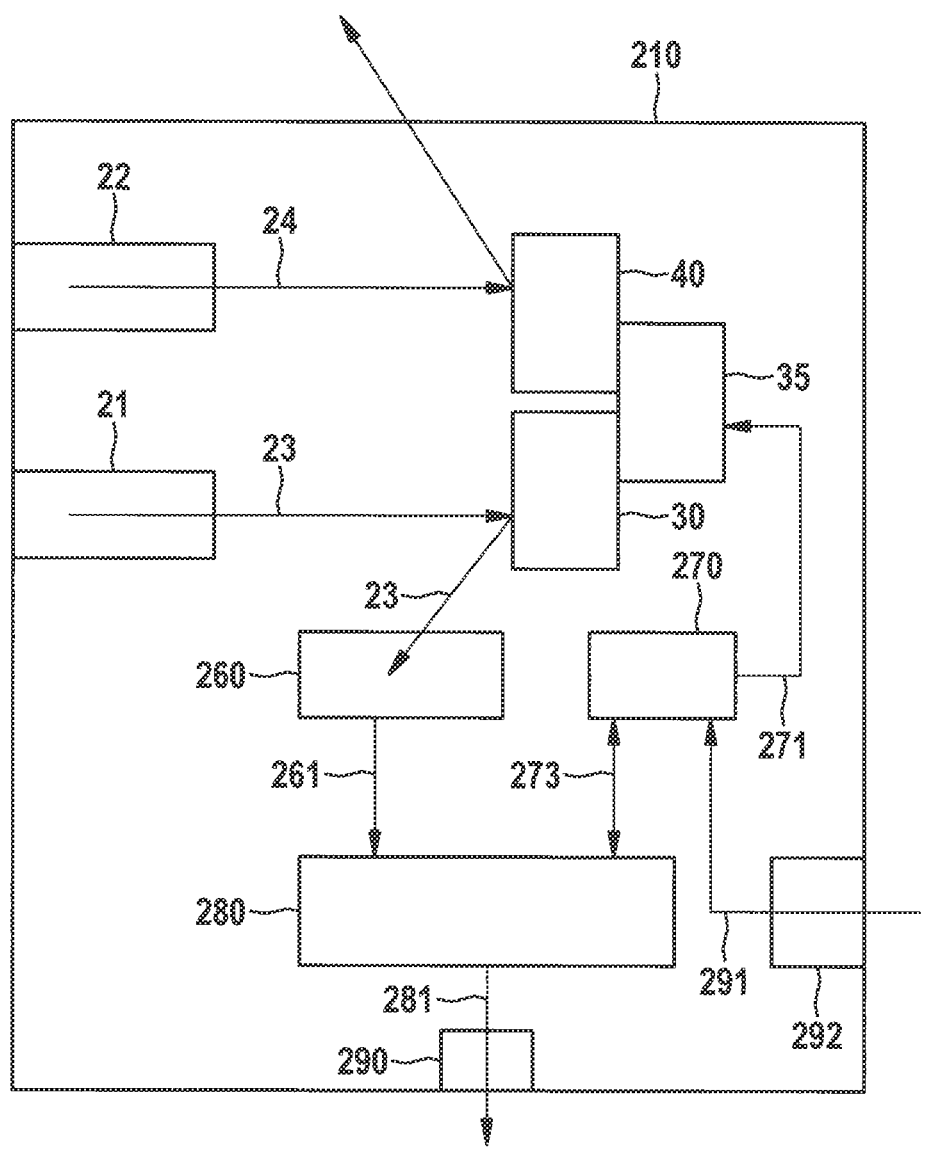
FIG. 4 shows a schematic block diagram of a micromechanical device 210 for projecting an image and for analyzing an optical spectrum according to another specific embodiment of the present invention.

FIG. 4 shows a schematic block diagram of a micromechanical device 210 for projecting an image and for analyzing an optical spectrum according to another specific embodiment of the present invention. Device 210 is a variant of device 10. The structures and refinements described on the basis of device 210 are also applicable to device 110 and vice versa.

In comparison to device 10, device 210 additionally includes an optical sensor device 260, for example, a photo diode, onto which first light beam 23, diffracted by optical diffraction unit 30, is guidable, and which is configured for generating an intensity signal 261 on the basis of an intensity of first light beam 23 guided onto optical sensor device 260, and a computing unit 280 with the aid of which a property of the optical spectrum of first light beam 23 is ascertainable on the basis of an instantaneously adjusted diffraction property of optical diffraction unit 30 of first micromirror 40 and on the basis of generated intensity signal 261. On the basis of the ascertained property, an output signal 281 is generatable and emittable by computing unit 280 and is tappable by device 210 via an interface 290.

Device 210 additionally includes a control device 270 which is configured for the purpose of controlling first actuator 35 via a data signal 271 according to an image to be projected and/or according to an optical spectrum to be analyzed. If device 110 is used, control device 270 may be configured to control first actuator 135 and also second actuator 155. Control device 270 and computing unit 280 may be configured to exchange additional data signals 273. With the aid of additional data signals 273, for example, an instantaneous adjustment of first and/or second actuator 35, 135, 155 is transmittable. Alternatively or additionally, with the aid of additional data signals 273, control device 270 is controllable with the aid of computing unit 280, to control first and/or second actuator 35, 135, 155 for targeted diffraction according to a measuring program of first light beam 23, 123, stored in computing unit 280, for analyzing the optical spectrum of first light beam 123. The image to be projected may be provided to control device 270 by a second image data signal 291 from outside of device 210 via a second interface 292.

Figure 5:
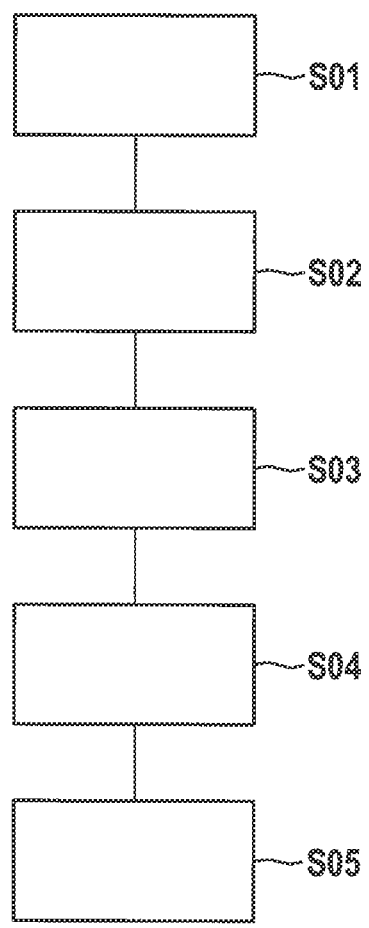
FIG. 5 shows a schematic flow chart for explaining a method for manufacturing a micromechanical device 10; 110; 210 for projecting an image and for analyzing an optical spectrum.

FIG. 5 shows a schematic flow chart for explaining a method for manufacturing a micromechanical device 10; 110, 210 for projecting an image and for analyzing an optical spectrum. The manufacturing method is suitable for manufacturing devices 10, 110, and 210 and may be specifically configured for this purpose. In particular, the method is adaptable according to all variants and refinements described with reference to devices 10, 110, and 210.

In a step S01, a first light providing unit 21; 121 is formed, with the aid of which a first light beam 23; 123 is providable to device 10; 110; 210. In a step S02, an optical diffraction unit 30; 130 is formed in such a way that first light beam 23; 123 provided to device 10; 110; 210 is diffractable as a function of an adjustable diffraction property of optical diffraction unit 30; 130.

In a step S03, a second light providing unit 22; 122 is formed, with the aid of which a second light beam 24; 124 is providable to device 10; 110; 210. In a step S04, a first micromirror 40; 140 is formed, with the aid of which second light beam 24; 124, provided to device 10; 110; 210, is variably deflectable as a function of a position and/or an orientation of first micromirror 40. In a step S05, a first actuator 35; 135 is formed, with the aid of which both the adjustable diffraction property of optical diffraction unit 30; 130 and the position and/or the orientation of first micromirror 40, 140 is/are adjustable.

Some or all described steps may be generated using micromechanical manufacturing methods like silicon etching or LIGA (lithography, electroplating, and molding).

Although the present invention has been described above based on preferred exemplary embodiments, it is not limited thereto, but instead is modifiable in many ways. In particular, the present invention may be changed or modified in a multitude of ways without departing from the core of the present invention.

For example, in device 210 or a corresponding variation of device 110, only first interface 290 and not, however, second interface 292, may be formed, the image to be projected being provided via first interface 290 from outside of the device to computing unit 280, with the aid of which the image to be projected is providable to control unit 270 via additional data signals 273.

What is claimed is:

1. A micromechanical device for projecting an image and for analyzing an optical spectrum, comprising:
    a device arrangement, including
        a first light providing unit by which a first light beam is providable to the device arrangement;
        an optical diffraction unit to diffract the first light beam provided to the device arrangement as a function of an adjustable diffraction property of the optical diffraction unit;
        a second light providing unit by which a second light beam is providable to the device arrangement; a first micromirror by which the second light beam provided to the device arrangement is variably deflectable as a function of at least one of: i) a position of the first micromirror, and ii) an orientation of the first micromirror; and
        a first actuator by which the adjustable diffraction property of the optical diffraction unit and also at least one of: i) the position of the first micromirror, and ii) the orientation of the first micromirror, are adjustable.

2. The device of claim 1, wherein the first micromirror has a curved surface as a mirror surface.

3. The device of claim 2, wherein the curved surface of the first micromirror is formed at least as a section of a circular cylinder surface.

4. The device of claim 2, wherein the first micromirror has a coated section of a glass fiber as the mirror surface.

5. The device of claim 2, wherein the second light beam is deflectable onto the first micromirror so that the second light beam strikes the curved surface of the first micromirror in an angle of incidence which is variable with the adjusted position of the first micromirror.

6. The device of claim 1, wherein the optical diffraction unit has a structure of engaging first and second lamellae, the first actuator being actuatable by applying an electric potential to at least one of: i)the first lamellae, and ii) the second lamellae, and the adjustable diffraction property of the optical diffraction unit resulting from a relative positioning of the first and second lamellae to one another, the positioning being based on the electric potential being applied to at least one of: i) the first lamellae, and ii) the second lamellae.

7. The device of claim 1, further comprising:
    a second micromirror; and
    a second actuator by which at least one of: i) a position of the second micromirror, and ii) an orientation of the second micromirror, is adjustable; the first micromirror, the second micromirror, and the second light providing unit being situated so that the second light beam provided to the device arrangement with the aid of the second light providing unit is deflectable by the first and also by the second micromirror; and at least one of: i) at least one of the position of the first micromirror and the orientation of the first micromirror, and ii) at least one of the position of the second micromirror and the orientation of the second micromirror, being adjustable so that the second light beam is deflectable to project the image in two directions.

8. The device of claim 1, further comprising:
an optical sensor device to which the first light beam, which is diffracted by the optical diffraction unit, is guidable, and which is configured to generate an intensity signal based on an intensity of the first light beam guided to the optical sensor device; and
a computing unit by which a property of the optical spectrum of the first light beam is ascertainable based on an instantaneously adjusted diffraction property of the optical diffraction unit and based on the generated intensity signal.

9. The device of claim 8, wherein the computing unit is automatically calibratable using the second light beam as a reference beam.

10. A method for manufacturing a micromechanical device for projecting an image and for analyzing an optical spectrum, the method comprising:

forming a first light providing unit by which a first light beam is providable to the device;
forming an optical diffraction unit so that the first light beam provided to the device is diffractable as a function of an adjustable diffraction property of the optical diffraction unit;
forming a second light providing unit by which a second light beam is providable to the device;
forming a first micromirror by which the second light beam provided to the device is variably deflectable as a function of at least one of: i) a position of the first micromirror, and ii) an orientation of the first micromirror; and
forming a first actuator by which the adjustable diffraction property of the optical diffraction unit and also at least one of: i) the position of the first micromirror, and ii) the orientation of the first micromirror, are adjustable.

* * * * *